United States Patent [19]

Zagdoun

[11] Patent Number: 5,342,676
[45] Date of Patent: Aug. 30, 1994

[54] GLASS SUBSTRATE PROVIDED WITH A LOW EMISSIVITY FILM

[75] Inventor: Georges Zagdoun, La Garenne Colombes, France

[73] Assignee: Saint-Gobain Vitrage International, Courbevoie, France

[21] Appl. No.: 981,083

[22] Filed: Nov. 24, 1992

[30] Foreign Application Priority Data

Nov. 26, 1991 [FR] France .............. 91 14569

[51] Int. Cl.$^5$ ............................. B32B 17/06
[52] U.S. Cl. ................... 428/216; 428/212; 428/428; 428/432; 428/697; 428/698; 428/701; 428/702; 428/704
[58] Field of Search ............ 428/216, 212, 697, 698, 428/428, 432, 701, 702, 704

[56] References Cited

U.S. PATENT DOCUMENTS

| | | | |
|---|---|---|---|
| 3,885,855 | 5/1975 | Gross | 359/580 |
| 4,377,613 | 3/1983 | Gordon | 428/212 |
| 4,568,578 | 2/1986 | Arfsten et al. | 428/697 |
| 5,004,503 | 4/1991 | Kawahara et al. | 428/428 |
| 5,073,451 | 12/1991 | Iida et al. | 428/618 |
| 5,206,089 | 4/1993 | Vilato et al. | 428/432 |

*Primary Examiner*—A. A. Turner
*Attorney, Agent, or Firm*—Oblon, Spivak, McClelland, Maier & Neustadt

[57] ABSTRACT

The invention has as its subject a glass substrate provided with a conducting, low-emissivity transparent functional film, based upon metal oxide or oxides, on which is deposited an "outer" coating, the optical thickness of which is approximately one-quarter of the mean wavelength of the visible range, and preferably centered on 550 nm. In addition, an intermediate coating is provided between functional film and substrate, said coating having an optical thickness of from 50 to 100 nm, and preferably from 50 to 75 nm.

14 Claims, No Drawings

GLASS SUBSTRATE PROVIDED WITH A LOW EMISSIVITY FILM

BACKGROUND OF THE INVENTION

Field of the Invention

This invention concerns a product comprising a glass substrate with a thin film of metallic oxide, having the properties of low emissivity, low resistivity (high conductivity), and high transparency. The invention also concerns methods for the production of a glass substrate with a thin metal oxide film, in particular using the techniques of pyrolysis from metal derivatives or vacuum techniques. The applications of the product are also described. This type of product is, in fact, of great interest in respect of its applications, more especially in the field of building construction.

It is, however, also possible to use this product for its low resistivity property of the film, which is linked with its low emissivity property. For example, forming heating panes by providing electrical bus bars notably as a heating windscreen or rear window in an automobile.

Similarly, this product may be used in optoelectronic devices, notably as a transparent electrode.

Discussion of the Background

A glass substrate coated with a low-emissivity film used for forming the glazing of a room enables the emission in the far infrared of said glazing from the room towards the outside to be reduced. This enables the comfort of the inhabitants to be improved, notably in winter, by reducing the energy losses due partly to an escape of this radiation outwards through the glazing. It is advantageously associated with another transparent substrate by means of a layer of gas, e.g.: to form a double glazing, so that the low-emissivity film shall be on face 3, counting from the outer face, to form an effective insulating double glazing.

The metal oxide films having these properties are, for example, films of indium oxide doped with tin (ITO), or of zinc oxide doped with aluminum (ZnO:Al), with indium (ZnO:In), with tin (ZnO:Sn) or with fluorine (ZnO:F), or of tin oxide doped with fluorine ($SnO_2$:F).

These metal oxide films may be obtained by various processes: by processes under vacuum (thermal evaporation, cathodic sputtering, optionally with the assistance of a magnetron) or by pyrolysis of organometallic compounds projected by a carrier gas in liquid, solid or gaseous form onto the surface of the glass substrate heated to a high temperature which nevertheless is lower than its softening temperature. These compounds, when thus brought into contact with a hot surface, decompose by oxidizing to form, on the surface, a metal oxide film. This latter technique is more particularly advantageous because it makes it possible to make direct deposits onto the glass ribbon from a production line of the float glass type in a continuous process.

However, in order that this type of functional film shall give to the glass substrate satisfactory performances in terms of emissivity and/or surface resistance, it is necessary for it to have a sufficient thickness, usually from at least 180 to 200 nm up to 400 nm. This non-negligible thickness, associated with a refractive index substantially different from that of the glass substrate, then leads to products having certain photometric characteristics which can present an aesthetic and/or energy problem.

Indeed, films of approximately 180 nm of tin oxide doped with indium (ITO) or of tin oxide doped with fluorine ($SnO_2$:F), are clearly blue in reflection, whereas they are more green when their thickness is approximately 360 nm.

In this latter case, for examples a film $SnO_2$:F deposited onto a clear glass substrate of 4 mm thickness gives to it a light reflection value $R_L$ on the "film side" greater than 10, and indeed greater than 15%, and a colour purity associated with this reflection which may exceed 10 to 15%, which implies a definitely coloured and reflective appearance of the substrate on the "film side" (that is the side which generally is on face 3 of a double glazing mounted in a buildings and therefore the side which is seen from outdoors when the facade is viewed). It may be stated, in fact, that the value of the purity indicates the intensity of the colour: the nearer it approaches 0%, the more it appears "whitish" and pastel. The colour therefore increases in relation to the value of the light reflection $R_L$.

Now the present-day trend is more towards a design of glazing panes, more especially those intended for buildings, which tend towards neutrality in reflection, notably when viewed from out of doors. And this colouration in reflection, of an interferential nature, is all the more of a nuisance in that it can vary as a function of the angle of incidence of measurement, which leads to building outer walls equipped with such panes exhibiting to the outdoor viewer an inhomogeneous appearance in colour.

Moreover, even though intrinsically a light reflection $R_L$ of approximately 15% is not great, it nevertheless indicates a certain fall in the quantity of solar energy transmitted, notably to the interior of the room, and therefore causes a reduction of several percent in the solar factor, which is the ratio of the sum of the solar energy transmitted and of the solar energy absorbed by the pane and then re-emitted towards the interior of the room to the incident solar energy. This is a disadvantage from the energy aspect, notably when it is desired to incorporate such a substrate in an insulating double glazing with the objective of lowering the heating costs.

Discussion of the Prior Art

Various studies have been carried out for partly resolving these problems linked to the use of a single functional film, notably for reducing the reflective effect or for attenuating the colour in reflection.

It has been proposed (FR-A-2 542 728) to cover the functional film with a dielectric coating, notably based on silicon dioxide ($SiO_2$), of a thickness of less than 160 nm as a function of the thickness of the underlying functional film, and the refractive index of which is approximately equal to the square root of the refractive index of the functional film. This choice is dictated essentially with the objective of increasing the light transmission factor $T_L$, and possibly also of protecting the functional film against abrasion. It is therefore not a question of influencing the intensity of the colouration in reflection, an intensity which is notably influenced by the purity value p.

Another possibility has been envisaged: (FR-A-2 439 167) this involves the insertion, between the glass substrate and the functional film, of an intermediate coating which may be monofilm, bifilm or multifilm, the presence of which, according to the authors, makes possible the attenuation both of a veil effect and of the iridescence phenomena in reflection, and even possibly acting as a barrier against the migration of alkaline ions contained in the glass substrate. In the case of a homogeneous monofilm, its refractive index is close to the square root of the product of the refractive indices of the glass substrate and of the functional film, while its optical thickness (the product of its physical thickness times its refractive index) is approximately one-quarter of the wavelength centered on 500 nm. Although attempting to eliminate iridescence (which results, by definition, from a non-uniformity of colouration in reflection due to a variation in the thickness of the film) by adding an additional covering, which is the objective of FR-A-2 439 167, can lead to a reduction in the total saturation of the colouration in reflection, it nevertheless is the case that this document neither investigates nor mentions an antireflective effect.

Furthermore, none of these documents recalls, and certainly they do not quantify, the evaluation of the influence of the angle of incidence upon the appearance in reflection, whereas it is more and more desired, for example in building construction, that the overall external appearance of the glazing with which a high external wall is provided, shall be uniform regardless of the angle of viewing.

SUMMARY OF THE INVENTION

An objective of this invention is therefore to devise a substrate of glass, provided with a low-emissivity film based upon metallic oxides which alleviates the defects previously mentioned by possessing both a light reflection value $R_L$ on the film side which is moderate and a quasi-neutrality in the colouration in reflection, even if the angle of incidence of the measurements differs from the perpendicular angle of incidence commonly chosen.

Another objective of the invention, possibly combined with the first, consists of proposing a product of the same type possessing an improved value of solar factor.

The invention has as its subject a substrate of glass, provided with a conducting, low-emissivity transparent functional film based upon metallic oxide or oxides, onto which is deposited an "outer" coating, the optical thickness of which is approximately one-quarter of the mean wavelength of the visible range, and preferably centered on 550 nm. In addition, an "intermediate" coating is provided between functional film and substrate, said coating having an optical thickness lying between 50 and 100 nm and preferably between 50 and 75 nm.

In the usual manner, the functional film has a refractive index n close to 2 and a physical thickness of from 200 to 400 nm, preferably of approximately 360 nm.

Said functional film is advantageously constituted of a doped metallic oxides such as indium oxide doped with tin (ITO), tin oxide doped with fluorine ($SnO_2$:F), zinc oxide doped with indium (ZnO:In), with fluorine (ZnO:F), with aluminum (ZnO:Al), or with tin (ZnO:Sn).

The intermediate coating preferably has a refractive index less than that of the functional film and lying approximately between 1.75 and 1.90; its physical thickness is, notably, of the order of 30 to 50 nm and preferably lies between 35 and 45 nm.

Two types of coating advantageously fulfill these conditions.

In the first type of coating, it is possible to form a coating based upon metallic oxide or oxides, and notably upon at least one of those belonging to the following group: aluminum oxide, titanium oxide, tin oxide, zinc oxide, indium oxide. In this way the refractive index is regulated by associating, for example, an oxide having a low refractive index such as aluminum oxide with at least one oxide having a high index, such as titanium oxide, tin oxide, indium oxide or zinc oxide, as mentioned in French Patent Application 90-15277.

The second type of intermediate coating which complies with these criteria is a coating based upon silicon oxynitride and/or silicon oxycarbide.

With regard to the outer coating, this is chosen in such a way as to have a refractive index lower than that of the functional film, and notably lying between 1.40 and 1.65. Its physical thickness is advantageously from 80 to 110 nm. preferably from 90 to 100 nm. Such a relatively low refractive index is obtained, for instance, with a film based upon silicon dioxide.

The essential advantage of the product according to this invention is in the fact of providing at least two coatings, between which the functional film is disposed. It is then possible to optimize the characteristics, essentially optical thickness, physical thickness and refractive index, of each of the coatings of the functional film in order to achieve the desired objectives, by offering possibilities of combination very much wider than in the case of a single coating, whether outer or intermediate coating. By combining the effects of these coatings, a good mastery is thereby obtained of the appearance in reflection of the product, without however lessening the properties inherent in the functional film.

In this way a kind of "synergy" effect is achieved between these two coatings, something that was rather unpredictable. This is more especially true in respect of the choice of the characteristics of the intermediate coating, of which in particular the physical thickness is very small by comparison with that of the functional film and of which the refractive index is less than that of the functional film, but nevertheless fairly close to it.

Thus, after selection within the aforementioned ranges of the optical thicknesses, and then as a consequence of the refractive indices and the physical thicknesses of the two coatings, a monolithic substrate according to this invention possesses, on the film side, a light reflection $R_L$ of at most 6%, accompanied by a purity of colouration in reflection on the perpendicular incidence of at most 3%. It also has an emissivity of at most 0.2.

When mounted in double glazing in such a way that the films are on face 3, this monolithic substrate has a slightly higher light reflection (but still less than 15%) with a purity of colouration in reflection still further reduced in perpendicular incidence, and even at most 5%, even at an angle of incidence for the measurement usually considered unfavorable. Its solar factor in perpendicular incidence reaches at least 0.76.

Such values of $R_L$ imply, first of all, an elimination of the greater part of the reflective effect of the glazing, thus enabling the value of energy transmission $T_E$ to be increased overall, and consequently the solar factor to be increased.

With regard to the values of purity of colouration in reflection, in association with the values of $R_L$, they give to the glazing according to this invention, whether monolithic or mounted as double glazing, an appearance very close to neutrality, even if an angle of incidence is chosen that is generally regarded as not very favorable and differing from the perpendicular incidence. In this way an improved homogeneity in the appearance of the glazing of a building outer wall as viewed from the outside is assured.

Any type of deposition technique can be employed for carrying out the deposition of the functional film and the coatings. Preferably, at least one of the films, when it is based upon metal oxide or oxides, can be deposited by a technique using vacuum, notably by cathodic sputtering, possibly reactive in the presence of oxygen, from targets of metal alloy or of ceramic of suitable compositions.

It is also a preferred embodiment to choose, for the deposition of at least one of the films, a pyrolysis technique in gaseous phase, also termed CVD (chemical vapour deposition), in the liquid phase or solid phase in the form of powders.

Thus in a preferred embodiment the "intermediate" coating may be deposited by pyrolysis in gaseous phase CVD from organometallic or silicon-containing precursors, or by pyrolysis of powder from organometallic precursors.

In yet another preferred embodiment, the functional film may readily be produced by pyrolysis. Thus, the films of $SnO_2$:F and ITO may advantageously be produced by powder pyrolysis. The films of tin oxide doped with fluorine can be produced from dibutyl tin oxide (DBTO) in powder form and gaseous anhydrous hydrofluoric acid, as described in Patent FR-2 380 997, from dibutyl tin difluoride (DBTF) possibly in a mixture with DBTO, as described in the document EP-A-178 956 or EP-A-039 256. With regard to the films of ITO, these may be produced, for example, from indium formate and a tin compound, such as DBTO described in document EP-A-192 009.

It is also possible to obtain the semiconducting films of $SnO_2$:F by pyrolysis in the gaseous phase, notably from a mixture of tin compounds such as $(CH_3)_2 SnCl_2$, $(C_4H_9)_2SnCl_2$, $Sn(C_2H_5)_4$, and organofluorinated compounds such as $CCl_2F_2$, $CHC_1F_2$, and $CH_3CHF_2$, as described in Patent Application EP-A-027 403,or again from monobutyl tin trichloride and a compound of formula $XCHF_2$, such as the chlorodifluoromethane mentioned in Patent Application EP-A-121 459.

The films of zinc oxide doped with indium or with aluminum can be obtained by vapour phase pyrolysis from diethyl zinc or zinc acetate and triethyl indium, indium chloride or triethyl aluminum, aluminum chloride, as described in Patent Application EP-A-385 769.

The films of $SnO_2$:F may also be obtained in liquid phase from tin acetylacetonate or from dimethyl tin-2-propionate in suitable organic solvent, as described notably in French Patent 2 211 411.

The outer coating is deposited preferably by gaseous phase pyrolysis CVD from silicon-containing precursors. When it is chosen in order to have a refractive index close to 1.40, it can advantageously be deposited by plasma-CVD also, as described in Patent EP-B-230 188.

In addition, the intermediate or outer coating, when it is based upon silicon dioxide and possibly also carbon and/or nitrogen, may also be deposited by plasma-CVD, a technique using vacuum described in Patent Application EP-A-413 617.

Having generally described this invention, a further understanding can be obtained by reference to certain specific examples which are provided herein for purposes of illustration only and are not intended to be limiting unless otherwise specified.

DESCRIPTION OF THE PREFERRED EMBODIMENTS

It should be stated first of all that all the depositions are performed on a substrate of clear silico-sodo-calcic float glass of 4 mm thickness. In the case of installation as double glazing, it is associated by means of an air layer of 12 mm thickness with another similar substrate, clear and of 4 mm thickness, the films being on face 3. It will be self-evident that this type of substrate is not limiting.

For comparison purposes all the examples refer to a functional film having identical characteristics, that is to say a thickness of 360 nm and a refractive index close to 1.9. The film is constituted of $SnO_2$:F and is produced in a manner known in the art from DBTF, as described for instance in the references above.

The intermediate coating, when it is constituted of a mixture of metal oxides, is produced in known manner by pyrolysis of powder, as described notably in Patent Application EP-A-0 489 621.

When it is constituted of a silicon oxide or oxycarbide, it is produced by CVD, also in known manner from silane and an ethylenic compound, by adapting for example the teaching of European Patent Application 92/401 593.6, corresponding to the U.S. application Ser. No. 07/897782. The same is true of the "outer" coating based upon silicon oxide.

All the spectrophotometric measurements were carried out with reference to illuminant $D_{65}$.

The abbreviations used in the tables have the following meanings: $R_L$=light reflection (%) on the film side; $T_L$=light transmission (%); FS=solar factor; $P_e$ (0°)= =purity of colour in reflection with perpendicular incidence (%); $P_e$(20) and $P_e$(40) is the purity measured at an angle of incidence varying by 20 and 40 degrees from the perpendicular incidence. All the thicknesses e are in nanometers (nm).

EXAMPLE 1

This is the reference example, since it comprises a substrate provided solely with the functional film. The characteristics of the product 1-a having a monolithic substrate and of the product 1-b having the substrate mounted as double glazing are indicated below:

| Example | $R_L$ | FS | $P_e$ (0°) |
| --- | --- | --- | --- |
| 1-a | 17 | — | 15.0 |
| 1-b | 22.4 | 0.72 | 10.0 |

Its appearance in reflection is therefore coloured, fairly strongly, in the greens.

EXAMPLES 2 TO 4

Examples 2 to 4 relate to an outer coating, always of identical form: this is a coating of 95 nm thickness and refractive index 1.45 based upon silicon dioxide, produced by CVD from silicon-containing compounds in a conventional manner.

In contrast, the characteristics of the intermediate coating (refractive index and thickness) are optimized.

EXAMPLE 2

The intermediate coating has a refractive index of 1.80 and a thickness of 37 nm. It is based upon a mixture of oxides of aluminum and zinc, obtained by powder pyrolysis of precursors in suitable proportions, notably from zinc acetate and aluminum triisopropylate, the latter constituting 20% by weight. These characteristics of refractive index and thickness, and also those of the following examples, are also readily obtained with films based upon oxygen and silicon, and possibly carbon, produced by CVD.

2-a corresponds to the monolithic substrate and 2-b to the substrate mounted in double glazing. The results are as follows:

| Example | FS | $R_L$ | Pe(0°) | Pe(20) | Pe(40) |
|---|---|---|---|---|---|
| 2-a | — | 4.5 | 1.12 | — | — |
| 2-b | 0.76 | 11.7 | 1.65 | 1.02 | 3.09 |

EXAMPLE 3

The intermediate coating has a thickness of 30 nm and a refractive index of 1.85. It is based upon a mixture of oxides of aluminum and indium obtained by powder pyrolysis from precursors, comprising 40% by weight indium formate and 60% by weight aluminum triisopropylate, or based upon silicon oxycarbide.

EXAMPLE 4

The intermediate coating has a refractive index of 1.75 and a thickness of 40 nm. It is based upon a mixture of oxides of aluminum and tin, formed by pyrolysis of a powder containing dibutyl tin difluoride (DBTF) and aluminum triisopropylate, the latter constituting 78% by weight of the total. A silicon oxycarbide may also be chosen.

The characteristics obtained for Examples 3 and 4 as monolithic substrates are summarized in the following table:

| Example | $T_L$ | $R_L$ | Pe(0°) | e |
|---|---|---|---|---|
| 3 | 85.5 | 4.7 | 0.44 | 30 |
| 4 | 85.7 | 4.4 | 2.69 | 40 |

It follows from Examples 2-a, 3 and 4 that it is possible to achieve, in reflection purity on the "film side" with perpendicular incidence, extremely low values, notably Example 3, that is to say that in which the coating has the strongest refractive index.

Furthermore, by comparing Examples 1 and 2-6, it may be noted that the solar factor is substantially increased when the functional film is provided with its coatings. Example 2-b indicates also that the purity in double glazing, even at angles of incidence notably different from perpendicular incidence, remains very low, and that therefore the external appearance of such panes viewed at different angles can be considered as almost homogeneous.

EXAMPLES 5 TO 6

These two examples have the same characteristics of intermediate coating, that in a thickness of 45 nm and a refractive index of 1.75, as those obtained in Example 4.

EXAMPLE 5

The outer coating has a refractive index of 1.45 and a thickness of 95 nm, and is a silicon oxide obtained by CVD as already referred to.

EXAMPLE 6

The external coating has a refractive index of 1.6 and a thickness of 85 nm. It is a film based upon oxygen, silicon and optionally carbon.

The characteristics of the two examples are summarized in the following table:

| Example | $T_L$ | $R_L$ | Pe(0°) |
|---|---|---|---|
| 5 | 85.8 | 4.3 | 2.79 |
| 6 | 84.4 | 5.9 | 1.60 |

These two examples allow a compromise possibility to be envisaged: in fact, the weaker the light reflection $R_L$, the more the solar factor is improved (Example 5). In contrast, Example 6 with a slightly higher $R_L$, has a purity that is almost two times less.

In conclusion, providing a functional film with two coatings, one on each of its faces, enables the field of investigations to be greatly broadened and choices to be made according to the primary objective as a function of the desired application: a neutrality in reflection, an improved solar factor, lower emissivity and resistivity, etc. It is by a selection of the optical thicknesses of these coatings in relation to the characteristics of the functional film that the invention arrives at this result.

Having now fully described the invention, it will be apparent to one of ordinary skill in the art that many changes and modifications can be made thereto without departing from the spirit or scope of the invention as set forth herein.

What is claimed as new and desired to be secured by letters patent of the United States is:

1. A product, comprising:
    a glass substrate;
    a conducting, low-emissivity transparent functional film on a first face of said glass substrate, having a refractive index of about 2 and a physical thickness of 200 to 400 nm, said functional film consisting of at least one doped metal oxide selected from the group consisting of indium oxide doped with tin, zinc oxide doped with indium, zinc oxide doped with fluorine, zinc oxide doped with aluminum, zinc oxide doped with tin, and tin oxide doped with fluorine;
    an outer coating on said functional film having a refractive index less than that of the functional film, the optical thickness of the outer coating being about one-quarter of the mean wavelength centered on 550 nm; and
    an intermediate coating disposed between the functional film and the glass substrate which has a refractive index less than that of the functional film and an optical thickness of between 50 and 100 nm.

2. The product according to claim 1, wherein the outer coating has a thickness of from 80 to 110 nm.

3. The product according to claim 1, wherein the intermediate coating has a physical thickness of from 30 to 50 nm.

4. The product according to any one of claims 1, 2 or 3, wherein the intermediate coating comprises at least one of the metal oxides selected from the group consisting of titanium oxide, aluminum oxide, zinc oxide, tin oxide and indium oxide.

5. The product according to any one of claims 1, 2 or 3, wherein the intermediate coating is at least one of silicon oxycarbide and silicon oxynitride.

6. The product according to any one of claims 1, 2 or 3, wherein the outer coating is based upon silicon dioxide.

7. The product according to claim 1 having a light reflection $R_L$ of at most about 6% and a purity of colouration in reflection of at most about 3% in perpendicular incidence and an emissivity of at most about 0.2 when measured from the film side.

8. The product according to claim 1, wherein a second glass substrate is associated with the first glass substrate to form a double glazing, said double glazing having a solar factor of at least about 0.76, a colour purity in reflection of at most about 5% at variable angle of incidence.

9. The product according to claim 1, wherein the intermediate coating has an optical thickness of between 50 and 75 nm.

10. The product according to claim 1, wherein the functional film has a thickness of about 360 nm.

11. The product according to claim 1, wherein the outer coating has a refractive index of from 1.40 to 1.65.

12. The product according to claim 2, wherein the outer coating has a thickness of from 90 to 100 nm.

13. The product according to claim 1, wherein the intermediate coating has a refractive index of from 1.75 to 1.90.

14. The product according to claim 3, wherein the intermediate coating has a physical thickness of from 35 to 45 nm.

* * * * *